(12) United States Patent
Macík et al.

(10) Patent No.: US 9,064,048 B2
(45) Date of Patent: Jun. 23, 2015

(54) MEMORY LEAK DETECTION

(75) Inventors: Pavel Macík, Raleigh, NC (US); Martin Večeřa, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 172 days.

(21) Appl. No.: 13/030,047

(22) Filed: Feb. 17, 2011

(65) Prior Publication Data
US 2012/0216076 A1    Aug. 23, 2012

(51) Int. Cl.
*G06F 11/00* (2006.01)
*G06F 11/36* (2006.01)

(52) U.S. Cl.
CPC .................................. *G06F 11/3612* (2013.01)

(58) Field of Classification Search
CPC . G06F 11/008; G06F 11/366; G06F 12/0253; G06F 11/3612
USPC ............................................... 714/38.1, 38.11
See application file for complete search history.

(56) References Cited

U.S. PATENT DOCUMENTS

| | | | |
|---|---|---|---|
| 6,597,907 B1 * | 7/2003 | Pruitt et al. .................... | 455/423 |
| 2005/0268156 A1 * | 12/2005 | Mashayekhi et al. ............. | 714/4 |
| 2006/0136530 A1 * | 6/2006 | Rossmann .................... | 707/206 |
| 2007/0083794 A1 * | 4/2007 | Yu .................................. | 714/38 |
| 2007/0136402 A1 * | 6/2007 | Grose et al. .................... | 707/206 |
| 2008/0250276 A1 * | 10/2008 | Martinez et al. ................ | 714/47 |
| 2008/0301504 A1 * | 12/2008 | Chen et al. ..................... | 714/42 |
| 2011/0289482 A1 * | 11/2011 | Bentley .......................... | 717/125 |

* cited by examiner

*Primary Examiner* — Jigar Patel
(74) *Attorney, Agent, or Firm* — Lowenstein Sandler LLP (57) ABSTRACT

A method and apparatus for memory leak detection is described. The method may include collecting memory usage data for a software application running in a computer system. The method may also include determining from the data that the software application has a memory leak.

9 Claims, 8 Drawing Sheets

MEMORY LEAK DETECTION

TECHNICAL FIELD

Embodiments of the invention relate to the field of software application testing, and more particularly, to determining when a software application has a memory leak.

BACKGROUND

In software application testing, software applications are subject to several tests in order to examine how fast, durable, and reliable the tested software application is. Software application testing also ensures that memory consumption by the software application will not have a growing tendency while the application is being executed. When there is an unnecessary growing tendency of memory consumption by the software application, the situation may arise where there may be no free memory available for the software application, other applications, system resources, etc.

The growing tendency of memory consumption by a software application may be referred to as a memory leak. A memory leak occurs when a software application consumes memory but either does not, or is unable to, release the memory back to an operating system. A memory leak generally can only be diagnosed manually by a programmer with access to the program source code. Thus, determining when a software application has a memory leak can be very difficult, time consuming, and often inaccurate.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for automatic memory leak detection is described. In one embodiment, the method includes collecting memory usage data for a software application running in a computer system. The method may also include automatically determining from the data that the software application has a memory leak.

In one embodiment, the memory leak is automatically detected by generating a model from the memory usage data that models memory usage by the software application over a period of time. In one embodiment, a trend may be determined in memory usage from the model. Furthermore, in one embodiment, a determination can be made from the trend whether the software application has a memory leak. In one embodiment, the model is generated based on a linear regression analysis of the memory usage data.

Figure 1:
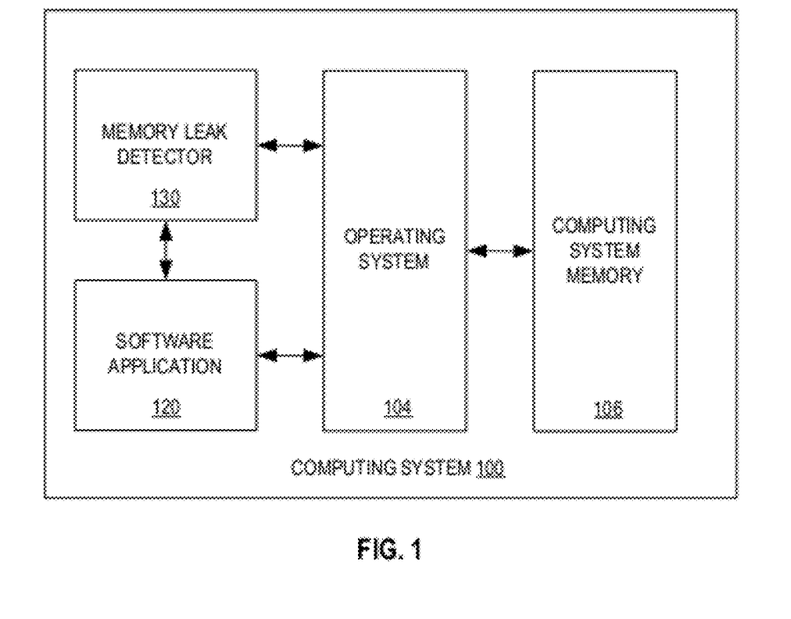
FIG. 1 is a block diagram of exemplary computing system for automatic memory leak detection.

FIG. 1 is a block diagram of exemplary computing system 100 for automatic memory leak detection. In one embodiment, the system includes an operating system 104, computing system memory 106, a software application 120, and memory leak detector 130. Although one software application is shown, in one embodiment, computing system 100 may run several software applications for which automatic memory leak detection may be applied as discussed herein.

In one embodiment, computing system 100 is a programmable machine that is capable of receiving input, storing and manipulating data, and providing output. In one embodiment, computing system 100 may be any of a desktop computer, server computer, laptop computer, tablet computer, palmtop computer, smart phone, electronic reader, etc. In one embodiment, computing system 100 may be coupled with other computing systems (not shown) over a network.

In one embodiment, computing system 100 includes operating system 104. Operating system 104 includes programs and data run on computing system 100 that manages computing system 100 hardware and software resources of the computing system 100. In one embodiment, operating system 104 may be an operating system based on WINDOWS™, UNIX™, LINUX™, BERKELEY SOFTWARE DISTRICUTION (BSD™), MAC OS™, a real-time operating system (RTOS), as well as any other operating system for running a computing system.

In one embodiment, for hardware functions such as memory management, operating system 104 acts as an intermediary between software applications and the computing system memory 106. In one embodiment, computing system memory may include one or more of a read-only memory (ROM), a static memory, a data storage device, etc. In one embodiment, operating system 104 manages all system memory of computing system 100, including computing system memory 106, which is currently in use by software application 120, other software applications, the operating system 104, and hardware devices (not shown) that may be integrated into or coupled with the computing system 100. Operating system 104 ensures that software applications do not interfere with memory already used by other software applications. Furthermore, for software applications run by the operating system 104 at the same time, operating system 106 ensures that each software application has independent access to computing system memory 106.

Operating system 104 further provides services for the execution of various software applications, such as software application 120, and acts as an interface between a software application 120 and hardware of the computing system 100. Operating system 104 executes software application 120 by assigning computing system memory 106 and other resources to software application 120, loading program code of software application 120 into memory, and executing the program code. Furthermore, operating system 104 may establish a priority for the execution of the software application 120 when multiple software applications are being executed by operating system 104 simultaneously.

When software application 120 is executed by operating system 104, software application 120 consumes and accesses computing system memory 106. Software application 120 may store objects, data, data streams, etc. in computing system memory 106. When software application 120 is finished with data stored in computing system memory 106, the memory should be released for other software applications to consume.

When data is not released by a software application, and as the software application consumes more memory, the software application is said to have a memory leak. That is, software application 120 may be consuming memory and either intentionally, or unintentionally, failing to release the memory resources. As a result of the increasing memory usage, potential resources are taken away from other software applications, the operating system, hardware devices, etc.

In one embodiment, memory leak detector 130 automatically determines whether software application 120 has a memory leak. In one embodiment, memory leak detector 130 is a stand alone software application that is executed by the operating system 104. In another embodiment, memory leak detector 130 is a software application plug-in for software application 120. In yet another embodiment, memory leak detector 130 is program code that may be embedded in software application 120. In one embodiment, memory leak detector monitors memory usage of the software application 120 in order to determine whether software application 120 has a memory leak.

In one embodiment, memory leak detector 130 collects memory usage data for software application 120 from the operating system 104. In one embodiment, memory leak detector 130 queries the operating system for the memory usage data. In one embodiment, memory leak detector 130 collects multiple samples of memory usage data over a period of time. In one embodiment, memory leak detector 130 analyzes two or more memory usage data samples to determine whether there is a memory leak. As will be discussed in greater detail below, in one embodiment a linear regression analysis is performed by memory leak detector 130 in order to determine a trend in the memory usage data. From the determined memory usage trend, memory leak detector 130 is able to determine whether memory usage by software application 120 is increasing over a period of time, decreasing over a period of time, or remains stable over a period of time.

In one embodiment, memory leak detector 130 determines that there is a memory leak when the memory usage trend is positive. That is, a positive memory usage trend indicates that more memory is being consumed by software application 120 than is being released. In one embodiment, when memory leak detector 130 determines that software application 120 has a memory leak, memory leak detector 130 generates a report of the memory leak. In one embodiment, the report may be an email, instant, or text message that is sent to a software developer, generation of an alert pop-up on a display window of computing system 100, setting a flag in a debugging file for the software application, etc. In one embodiment, memory leak detector 130 may further cause operating system 104 to terminate the software application 120 with the memory leak. Therefore, in one embodiment, memory leaks in software applications may be automatically and accurately detected, and actions taken to remedy the memory leak.

Figure 2:
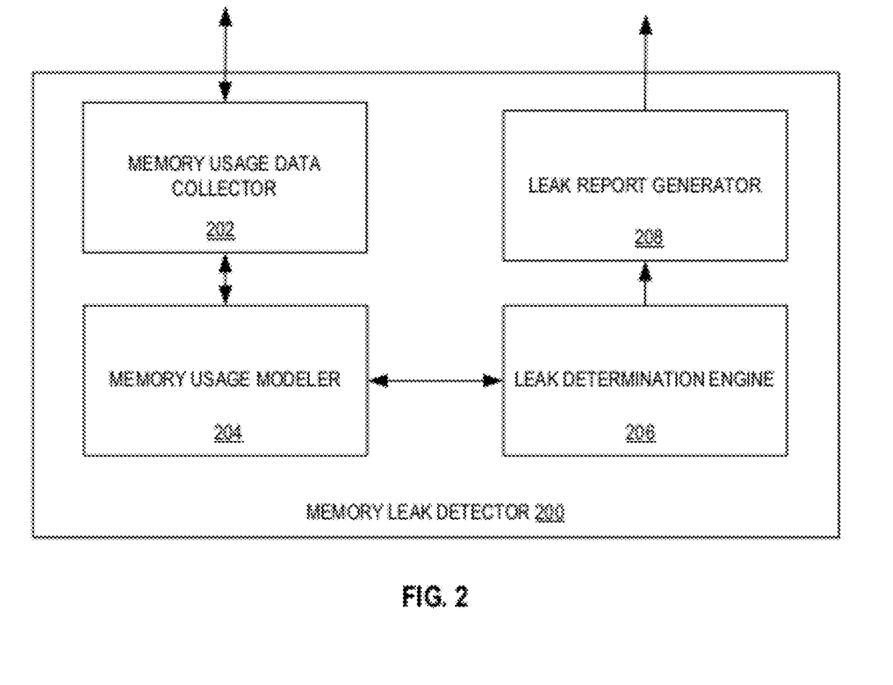
FIG. 2 is a block diagram of one embodiment of a memory leak detector.

FIG. 2 is a block diagram of one embodiment of a memory leak detector 200. Memory leak detector 200 may include a memory usage data collector 202, memory usage modeler 204, a leak determination engine 206, and a leak report generator 208. In one embodiment, memory leak detector 200 monitors a software application. In another embodiment, memory leak detector 200 monitors a plurality of software applications that are run either synchronously or asynchronously.

In one embodiment, memory usage data collector 202 is responsible for collecting memory usage data for a software application. In one embodiment, memory usage data collector 202 queries an operating system for the memory usage data. In one embodiment, memory usage data collector 202 queries the operating system a number of times for a total memory usage of a software application over a period of time. In one embodiment, memory usage data collector 202 stores the memory usage data in a data set to be analyzed for an indication that a software application has a memory leak.

In one embodiment, the memory usage data set includes a plurality of data points collected by the memory usage data collector 202. In one embodiment, memory usage data collector 202 collects an initial memory usage data $(t_0, u_0)$, where $u_0$ is the memory usage of the software application and $t_0$ is the time when $u_0$ was collected. Memory usage data collector 202 periodically queries the operating system for additional memory usage data over a period of time to obtain an optimal data set for memory usage modeler 204. In one embodiment, the memory usage data set includes at least two memory usage data points. However, in another embodiment, a plurality of data points (e.g., one hundred, one thousand, etc.) are collected by memory usage data collector 202.

In one embodiment, memory usage modeler 204 is responsible for analyzing the memory usage data set collected by memory usage data collector 202. In one embodiment, memory usage modeler 204 performs linear regression analysis of the memory usage data set in order to generate a model for the memory usage data. Although linear regression analysis is discussed herein, other modeling methods may be applied, such a non-linear regression, least squares regression, etc., to model the memory usage data.

Figure 4A:
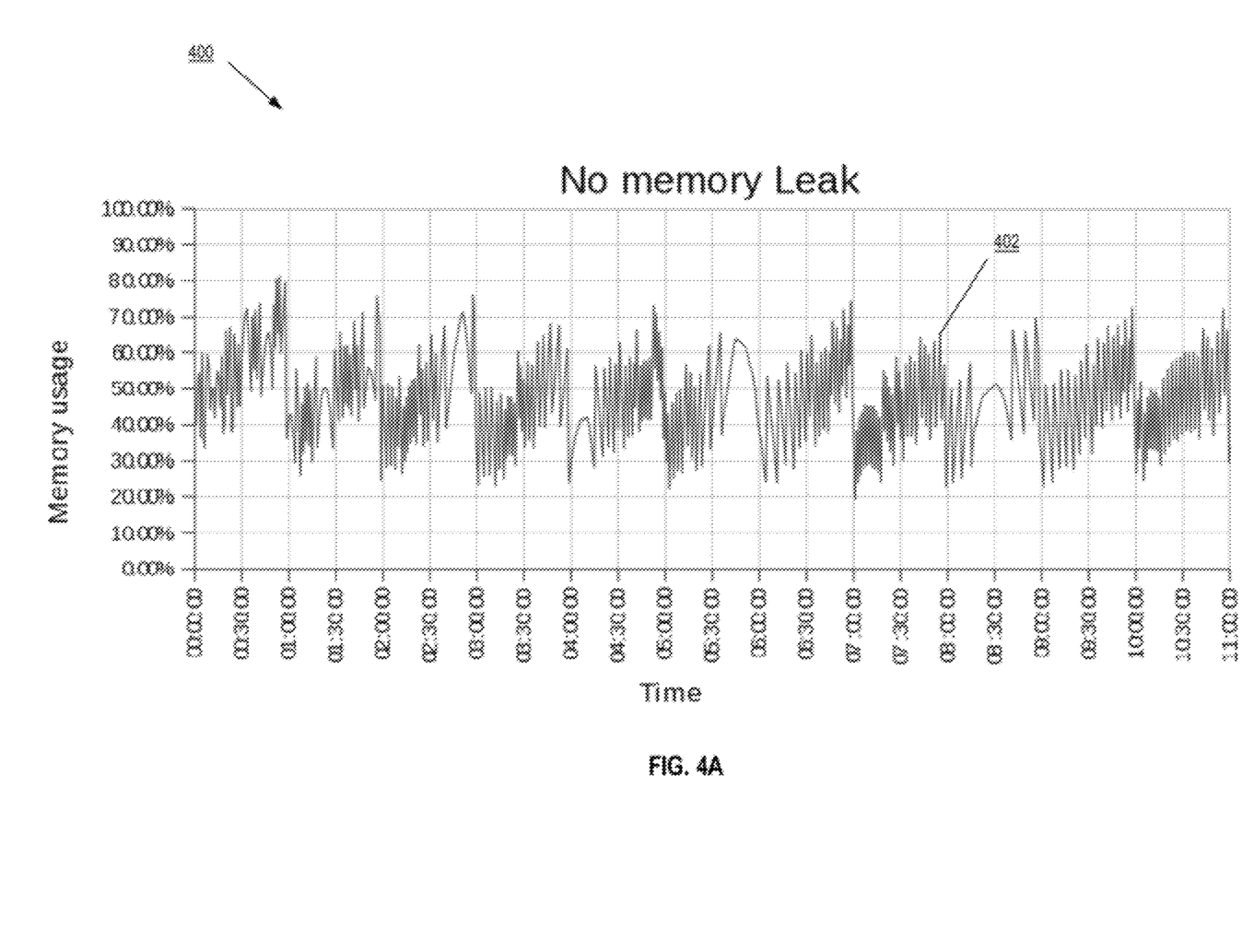
FIG. 4A graphically illustrates memory usage of a software application without a memory leak.
Figure 4B:
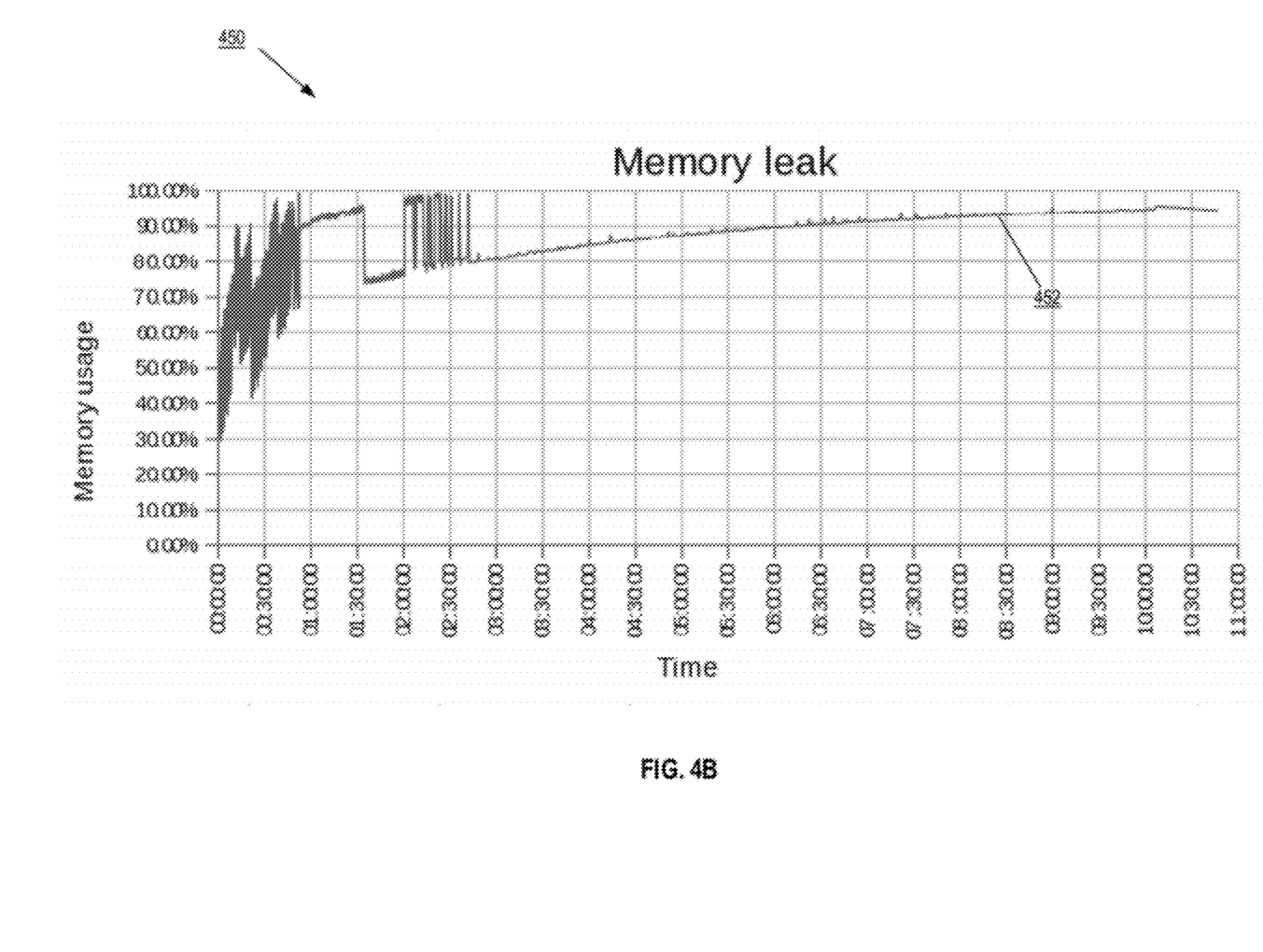
FIG. 4B graphically illustrates memory usage of a software application with a memory leak.

In one embodiment, memory usage modeler 204 accesses the memory usage data set $(t_0, u_0), (t_1, u_1) \ldots (t_n, u_n)$ for a software application over a period of time $t_0$ through $t_n$. For example, FIGS. 4A and 4B illustrate memory usages 402 and 452 of a software application over a period of time. In FIG. 4A, memory usage 402 is fluctuating over time, and as discussed below is for a software application that does not have a memory leak. FIG. 4B, however, illustrates memory usage 452 that at first fluctuates, but then steadily increases over time. In one embodiment, the memory usage data 452 of FIG. 4B is illustrative of a memory leak.

In one embodiment, memory usage modeler 204 then performs linear regression analysis on the data set $(t_i, u_i)$ with n data points to obtain the linear function for memory usage of the software application over time:

$$u = mt + b \quad (1)$$

where m is the slope of the function, and b is the vertical axis intercept for equation (1).

In one embodiment, given the set of data points $(t_i, u_i)$ for i from 0 to n, m and b are determined by memory usage modeler 204 by calculating:

$$m = (n\Sigma(tu) - \Sigma(t)\Sigma(u))/(n\Sigma(t^2) - (\Sigma t)^2) \quad (2)$$

$$b = (\Sigma(u) - m\Sigma(t))/n \quad (3)$$

where the limits of the summation are from 0 to n. In one embodiment, once m and b are obtained by memory usage modeler 204, leak determination engine 206 may utilize the resulting function (1) to determine whether a software application has a memory leak.

In one embodiment, leak determination engine 206 analyzes function (1), which is completed using the results of equations (2) and (3) above. In one embodiment, leak determination engine 206 obtains m from the equation (2) calculation performed by memory usage modeler 204. In one embodiment, m is the slope of equation 1. In one embodiment, when the slope is positive, leak determination engine 206 interprets a software application being monitored as having a memory leak. However, when the slope is either zero or negative, leak determination engine 206 interprets the software application being monitored as not have a memory leak.

Figure 5A:
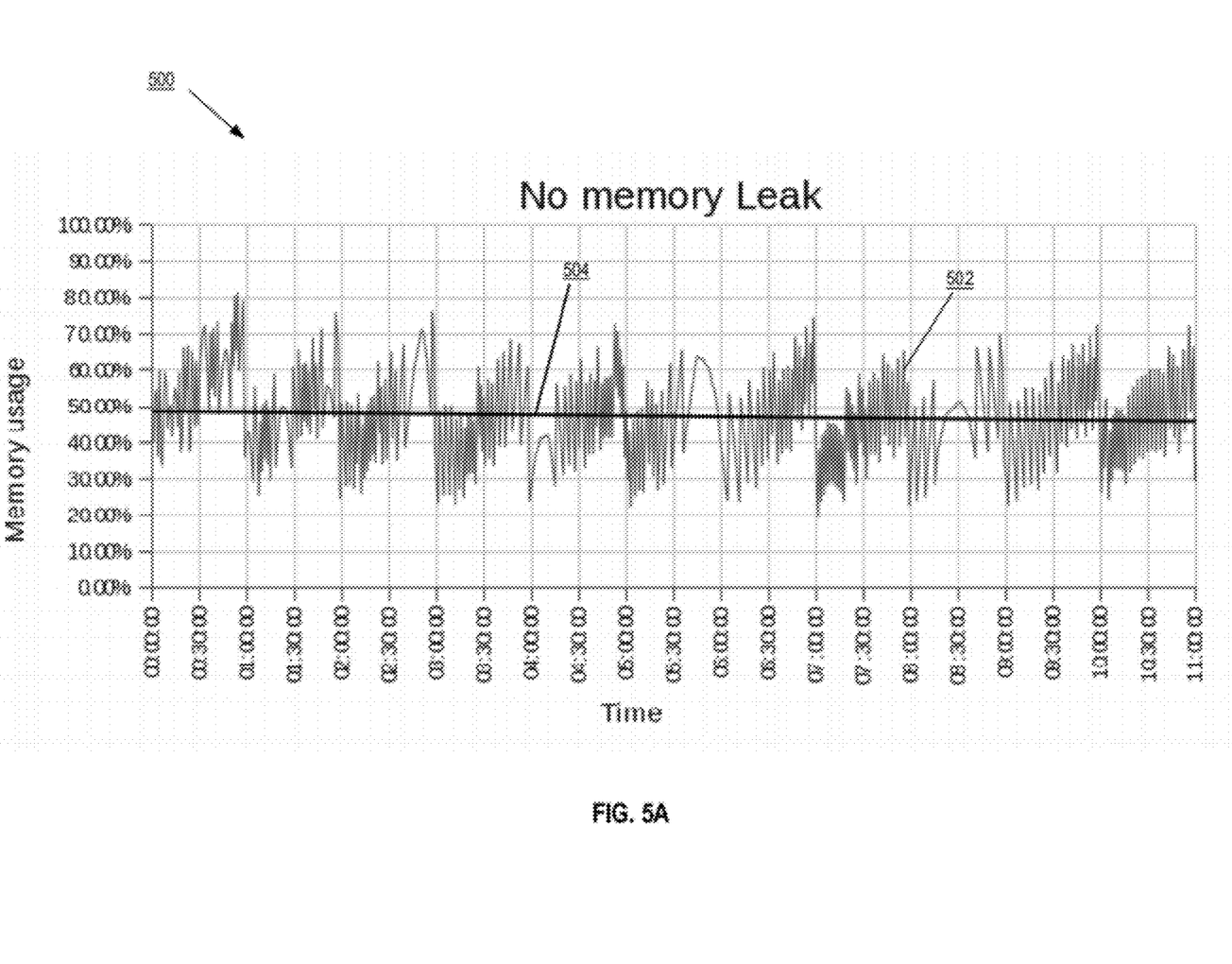
FIG. 5A graphically illustrates a memory usage model superimposed over memory usage data for a software application without a memory leak.
Figure 5B:
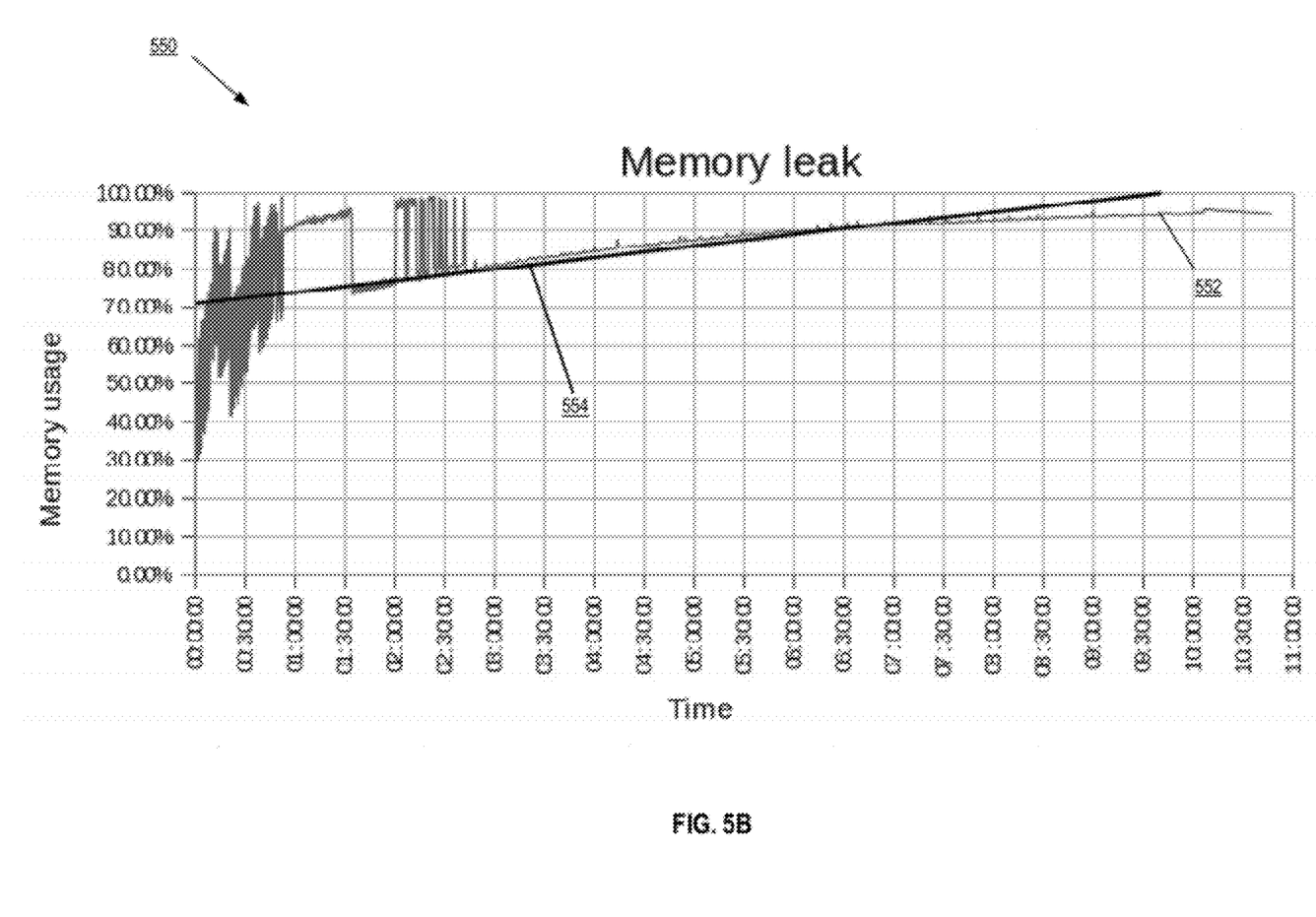
FIG. 5B graphically illustrates a memory usage model superimposed over memory usage data for a software application with a memory leak.

FIGS. 5A and 5B illustrate memory usage data 502 and 552 for two different software applications collected over a period of time. The memory usage data is graphically displayed with time as the horizontal axis and memory usage as the vertical axis. In the illustrated embodiments of FIGS. 5A and 5B, memory usage 502 and 552 is measured as the percentage of total memory usage in a computing system by a software application. In FIG. 5A, line 504 is the line obtained by calculating equation (1) from equations (2) and (3). Line 504, as illustrated, has a decreasing slope (i.e., m has a negative value), and thus leak determination engine 206 interprets the associated software application as not having a memory leak. In FIG. 5B, line 554, as illustrated, has an increasing slope (i.e., m has a positive value), and thus leak determination engine 206 interprets the associated software application as having a memory leak.

In one embodiment, leak report generator 208 receives a notification from leak determination engine 206 when a memory leak has been detected. In one embodiment, leak report generator 208 is responsible for generating reports to notify a user (e.g., a software developer, a quality assurance (QA) engineer, etc.) that a memory leak exists in a particular software application. In one embodiment, leak report generator 208 may generate an alert in the form of one or more of an email message, text message, instant message, etc. with data indicating that a memory leak has been detected. In one embodiment, the alert may include data from memory usage data collector 202 or memory usage modeler 204 such as the identity of the software application with the memory leak, a graphical illustration of the memory usage over time as illustrated in FIGS. 4A and 4B, a graphical illustration of the regression analysis equation superimposed on the memory usage data as illustrated in FIGS. 5A and 5B, raising a flag in a software debugging application, etc.

In one embodiment, leak report generator 208 may further terminate the software application with the memory leak. In one embodiment, leak report generator 208 notifies an operating system to stop execution of the software application with the memory leak.

Figure 3:
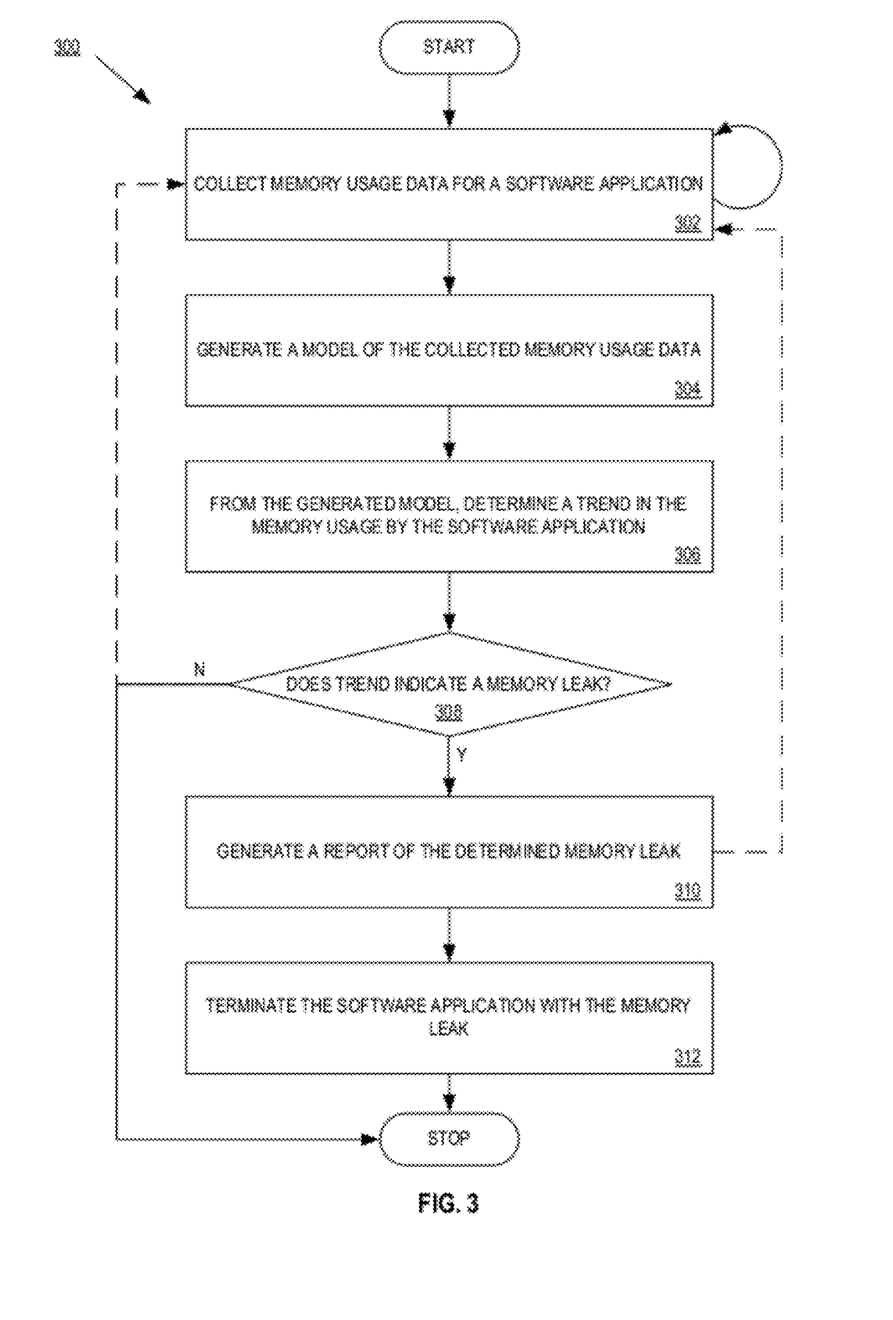
FIG. 3 is a flow diagram of one embodiment of a method for automatic memory leak detection.

FIG. 3 is a flow diagram of one embodiment of a method 300 for automatic memory leak detection. The method 300 is performed by processing logic that may comprise hardware (circuitry, dedicated logic, etc.), software (such as is run on a general purpose computer system or a dedicated machine), firmware, or a combination. In one embodiment, the method 300 is performed by a memory leak detector (e.g., memory leak detector 130 of FIG. 1 or memory leak detector 200 of FIG. 2).

Referring to FIG. 3, the process begins by collecting memory usage data for an application (processing block 302). In one embodiment, processing logic issues queries to a utility of an operating system executing the software application for memory usage data associated with the software application. In one embodiment, processing logic issues a plurality of queries to the operating system over a period of time. In one embodiment, processing logic issues two or more queries to the operating system for memory usage data. In one embodiment, the memory usage data u is collected as a data set $(t_i, u_i)$ for time $t_0$ through time $t_n$.

A model is generated from the collected memory usage data (processing block 304). In one embodiment, processing logic performs linear regression analysis on the memory usage data set to obtain an equation for a line (e.g., equation (1) above) that models the memory usage data. In one embodiment, another method, such as non-linear regression, may be utilized by processing logic to model the memory usage data set.

Processing logic determines a trend in the memory usage by the software application from the generated model (processing block 306). In one embodiment, where linear regression analysis is used to model the memory usage data set, processing logic utilizes a slope of the resulting memory usage model as an indicator of whether or not a software application has a memory leak. When the slope is either negative or zero, processing logic interprets the memory usage trend as either decreasing or steady. However, when the slope is positive, processing logic interprets the memory usage trend as increasing.

Processing logic determines whether the trend indicates a memory leak (processing block 308). In one embodiment, processing logic determines whether there is positive trend in memory usage by a software application. When processing logic does not detect a memory leak (e.g., the memory usage model indicates a steady or decreasing memory usage trend), in one embodiment, the process ends. In another embodiment, the process may return to processing block 302 to continue to collect memory usage data for the software application.

When processing logic determines that a software application has a memory leak (e.g., the memory usage model indicates an increasing memory usage trend), a report is generated for the determined memory leak (processing block 310). In one embodiment, the report is generated to alert a user, such as a software developer, system administrator, etc., that a software application has a memory leak. In one embodiment, the report may be one or more of an email message, text message, multimedia message, instant message, etc. In one embodiment, the report may indicate that a software application has a memory leak and provide a graphical illustration of memory usage data, as illustrated in FIGS. 4A and 4B. In one embodiment, the graphical illustration may further include the memory usage model superimposed over the memory usage data, as illustrated in FIGS. 5A and 5B.

In one embodiment, processing logic further causes the termination of the software application with the memory leak (processing block 312). In one embodiment, processing logic issues a command to an operating system to stop execution of the software application with the memory leak. In one embodiment, instead of terminating the software application, processing logic may return to processing block 302 to further collect memory usage data for the software application.

Figure 6:
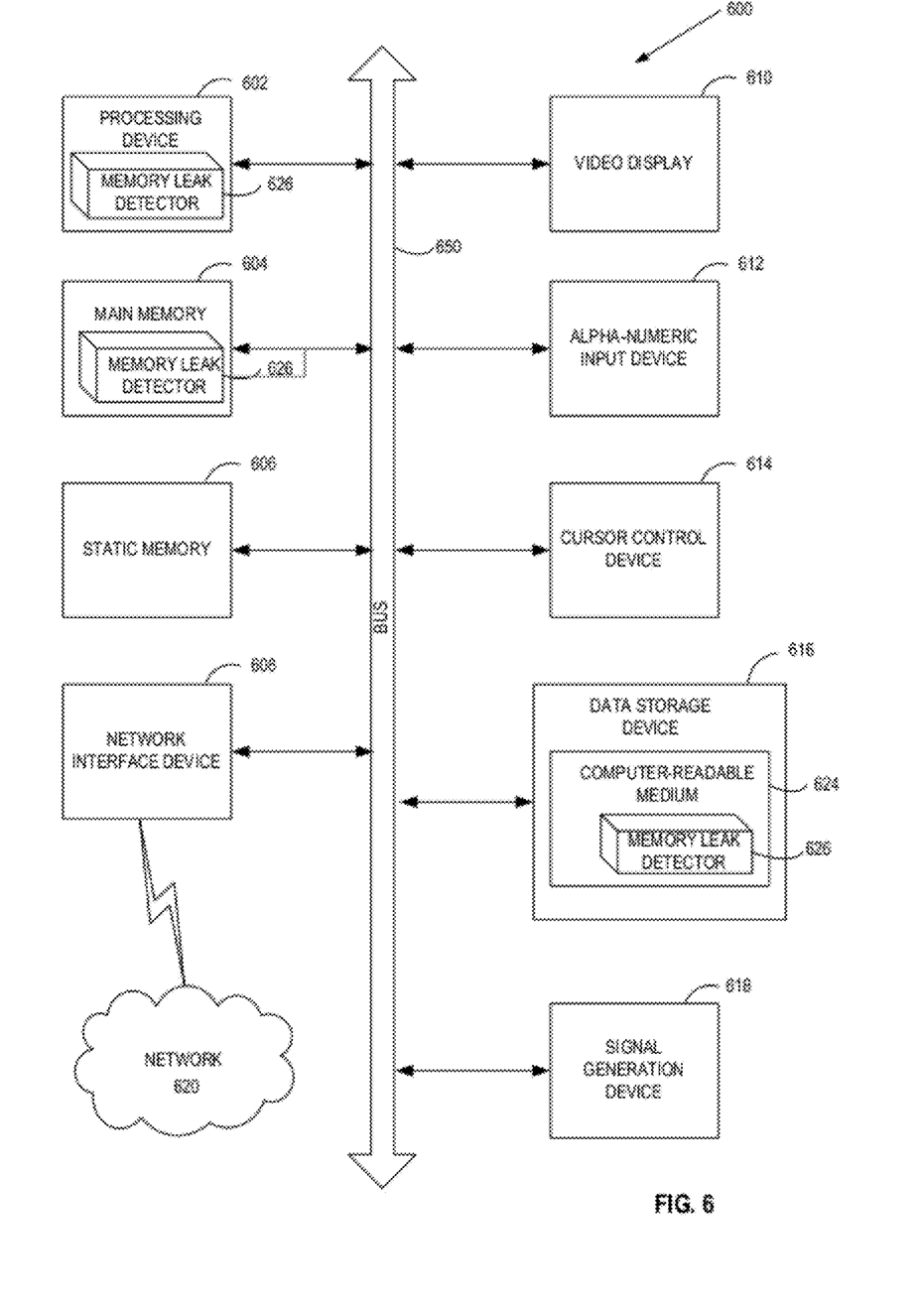
FIG. 6 illustrates a diagrammatic representation of a machine in the exemplary form of a computer system.

FIG. 6 illustrates a diagrammatic representation of a machine in the exemplary form of a computer system 600, which provides additional details for the computing system 100 of FIG. 1, within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 616, which communicate with each other via a bus 650.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the memory leak detector 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 618 (e.g., a speaker).

The data storage device 616 may include a computer readable medium 624 on which is stored one or more sets of instructions (e.g., memory leak detector 626) embodying any one or more of the methodologies or functions described herein. The memory leak detector 626 may also reside, completely or at least partially, within the main memory 604 and/or within the processing device 602 during execution thereof by the computer system 600, the main memory 604 and the processing device 602 also constituting computer readable media. The memory leak detector 626 may further be transmitted or received over a network 620 via the network interface device 608.

While the computer readable medium 624 is shown in an exemplary embodiment to be a single medium, the term "computer readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding or carrying a set of instructions for execution by the machine and that cause the machine to perform any one or more of the methodologies of the present invention. The term "computer readable medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting", "determining", "generating", "sending", "terminating", "querying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method comprising:
collecting memory usage data, from an operating system of a computer system, for a first software application running in the computer system;
generating a model in view of a linear regression analysis of the memory usage data for the first software application running over a period of time;
determining a trend in memory usage from the model, wherein the trend indicates memory usage by the first software application running over the period of time;
in response to determining the trend in memory usage increases over the period of time:
determining from the memory usage data that the first software application has a memory leak;
issuing, by a first processing device, a first command to the operating system of the computer system to terminate the first software application in view of the determined memory leak;
issuing, by the second processing device, a second command to a software debugging application to debug the first software application in view of the determined memory leak;
generating a report comprising at least one of an email message, a text message, a multimedia message, or an instant message comprising an indication of the first software application that is determined to have the memory leak in the computer system;
transmitting the report;
determining whether at least one other software application is being executed by the operating system;
in response to determining that at least one other software application is being executed by the operating system:
monitoring the first software application and the at least one other software application; and
establishing a higher priority for execution of the first software application, wherein the higher priority is established after determining the memory leak of the first software application.

2. The method of claim 1, wherein the trend defines a slope of a line that models the memory usage data over the period of time.

3. The method of claim 1, wherein generating the report further comprises:
generating an electronic message indicative of the memory leak of the first software application; and
sending the electronic message to a user.

4. The method of claim 1, wherein collecting further comprises:
querying the operating system of the computer system for the memory usage data of the first software application.

5. A non-transitory computer readable storage medium that provides instructions, which when executed by a processing device, cause the processing device to:
collect memory usage data, from an operating system of a computer system, for a first software application running in the computer system;
generate a model in view of a linear regression analysis of the memory usage data for the first software application running over a period of time;
determine a trend in memory usage from the model, wherein the trend indicates memory usage by the first software application running over the period of time;
in response to determine the trend in memory usage increases over the period of time:
determine from the memory usage data that the first software application has a memory leak;
issue, by the processing device, a first command to the operating system of the computer system to terminate the first software application in view of the determined memory leak;
issue, by the processing device, a second command to a software debugging application to debug the first software application in view of the determined memory leak;
generate a report comprising at least one of an email message, a text message, a multimedia message, or an instant message comprising an indication of the first software application that is determined to have the memory leak in the computer system, wherein the report comprises a graphical display of the memory usage data that illustrates the memory leak;
transmitting transmit the report;
determine whether at least one other software application is being executed by the operating system;
in response to determine that at least one other software application is being executed by the operating system:
monitor the first software application and the at least one other software application; and
establish a higher priority for execution of the first software application, wherein the higher priority is established after determine the memory leak of the first software application.

6. The non-transitory computer readable storage medium of claim 5, wherein the trend defines a slope of a line that models the memory usage data over the period of time.

7. The non-transitory computer readable storage medium of claim 5, wherein generate the report further comprises:
generate an electronic message indicative of the memory leak of the first software application; and
send the electronic message to a user.

8. The non-transitory computer readable storage medium of claim 5, wherein collect further comprises:
query the operating system of the computer system for the memory usage data of the first software application.

9. A system comprising:
a memory; and
a processing device coupled with the memory to execute a memory leak detector to:
collect memory usage data, from an operating system of a computer system, for a first software application running in the computer system;
generate a model in view of a linear regression analysis of the memory usage data for the first software application running over a period of time;
determine a trend in memory usage from the model, wherein the trend indicates memory usage by the first software application running over the period of time;
in response to determine the trend in memory usage increases over the period of time:
determine from the data that the first software application has a memory leak, issue a first command to the operating system of the computer system to terminate the first software application in view of the determined memory leak, issue a second command to a software debugging application to debug the first software application in view of the determined memory leak, generate a report comprising at least one of an email message, a text message, a multimedia message, or an instant message comprising an indication of the first software application that is determined to have the memory leak in the computer system, wherein the report comprises a graphical display of the memory usage data that illustrates the memory leak, transmit the report;

determine whether at least one other software application is being executed by the operating system;

in response to determining that at least one other software application is being executed by the operating system:
   monitor the first software application and the at least one other software application; and
   establish a higher priority for execution of the first software application, wherein the higher priority is established after determine the memory leak of the first software application.

* * * * *